(12) United States Patent
Meyers et al.

(10) Patent No.: US 8,620,623 B2
(45) Date of Patent: Dec. 31, 2013

(54) HIERARCHICAL AND DISTRIBUTED INFORMATION PROCESSING ARCHITECTURE FOR A CONTAINER SECURITY SYSTEM

(75) Inventors: Richard C. Meyers, Longboat Key, FL (US); Ronald Easley, Arlington, VA (US); Ron Martin, Arlington, VA (US)

(73) Assignee: GlobalTrak, LLC, Arlington, VA (US)

( * ) Notice: Subject to any disclaimer, the term of this patent is extended or adjusted under 35 U.S.C. 154(b) by 0 days.

(21) Appl. No.: 11/598,828

(22) Filed: Nov. 14, 2006

(65) Prior Publication Data

US 2007/0118332 A1    May 24, 2007

Related U.S. Application Data

(60) Provisional application No. 60/735,850, filed on Nov. 14, 2005.

(51) Int. Cl.
  *H04L 12/26*  (2006.01)
  *H04L 12/46*  (2006.01)
  *G06F 17/40*  (2006.01)
  *G06F 11/30*  (2006.01)
  *G06F 19/00*  (2011.01)

(52) U.S. Cl.
  USPC ............. 702/187; 73/865.8; 340/517; 702/1; 702/127; 705/333; 709/252; 712/28

(58) Field of Classification Search
  USPC ......... 702/36, 130, 140, 182, 188–191, 1, 33, 702/35, 127, 138, 187; 73/432.1, 570, 73/865.8, 866.3; 340/500, 501, 517, 521, 340/522, 531, 539.1, 539.26, 540, 568.1, 340/571, 572.1, 665, 669, 870.01, 870.07, 340/870.16; 705/1.1, 28, 330, 333; 708/100, 105, 200; 709/201, 217, 218, 709/219, 252; 712/1, 28
  IPC .............. G01D 7/00,21/00; G06F 11/00, 11/30, G06F 11/32, 17/00, 17/40, 19/00; G06Q 10/00, G06Q 10/08, 10/083, 10/0833, 10/087, 50/00, G06Q 50/28, 50/30; H04L 12/00, 12/02, H04L 12/26, 12/2602, 12/28, 12/46
  See application file for complete search history.

(56) References Cited

U.S. PATENT DOCUMENTS

| | | | | |
|---|---|---|---|---|
| 2,883,255 | A * | 4/1959 | Anderson | 346/34 |
| 3,944,723 | A * | 3/1976 | Fong | 178/3 |
| 4,234,926 | A * | 11/1980 | Wallace et al. | 702/188 |
| 4,688,244 | A * | 8/1987 | Hannon et al. | 377/58 |
| 4,772,875 | A * | 9/1988 | Maddox et al. | 340/522 |
| 4,821,267 | A * | 4/1989 | Druegh et al. | 714/712 |
| 5,553,094 | A * | 9/1996 | Johnson et al. | 375/130 |
| 6,553,336 | B1 * | 4/2003 | Johnson et al. | 702/188 |
| 6,577,921 | B1 * | 6/2003 | Carson | 700/214 |
| 6,745,027 | B2 * | 6/2004 | Twitchell, Jr. | 455/422.1 |

(Continued)

FOREIGN PATENT DOCUMENTS

WO    WO 02/30140 A2 *    4/2002

*Primary Examiner* — Edward Cosimano
(74) *Attorney, Agent, or Firm* — Horizon Patent Group, LLP

(57) ABSTRACT

A hierarchical and distributed system architecture for a container monitoring and security system is provided. The architecture may be a hierarchical chain of separate, related processing elements. The partitioning of functions and distribution of processing among these or other similar hierarchical elements in the network is provided. The elements may further be described in successive layers, each have a greater level of network intelligence than the former.

18 Claims, 2 Drawing Sheets

(56) References Cited

U.S. PATENT DOCUMENTS

| | | | |
|---|---|---|---|
| 7,002,472 B2* | 2/2006 | Stratmoen et al. | 340/539.26 |
| 7,098,784 B2* | 8/2006 | Easley et al. | 340/539.13 |
| 7,196,622 B2* | 3/2007 | Lambright et al. | 340/539.26 |
| 7,218,215 B2* | 5/2007 | Salisbury et al. | 340/505 |
| 7,221,668 B2* | 5/2007 | Twitchell, Jr. | 370/338 |
| 7,479,877 B2* | 1/2009 | Mortenson et al. | 340/545.6 |
| 7,983,685 B2* | 7/2011 | Silverstrim et al. | 455/447 |
| 2002/0042694 A1* | 4/2002 | Henry et al. | 702/188 |
| 2002/0119770 A1* | 8/2002 | Twitchell, Jr. | 455/422 |
| 2004/0041706 A1* | 3/2004 | Stratmoen et al. | 340/539.26 |
| 2004/0113783 A1* | 6/2004 | Yagesh | 340/568.1 |
| 2004/0148139 A1* | 7/2004 | Nguyen et al. | 702/189 |
| 2005/0046567 A1* | 3/2005 | Mortenson et al. | 340/539.13 |
| 2005/0073406 A1* | 4/2005 | Easley et al. | 340/539.1 |
| 2005/0154527 A1* | 7/2005 | Ulrich | 701/207 |
| 2006/0018274 A1* | 1/2006 | Twitchell, Jr. | 370/328 |
| 2008/0137624 A1* | 6/2008 | Silverstrim et al. | 370/338 |

* cited by examiner

HIERARCHICAL AND DISTRIBUTED INFORMATION PROCESSING ARCHITECTURE FOR A CONTAINER SECURITY SYSTEM

CLAIM OF PRIORITY

The present invention claims priority to U.S. Provisional Patent Application No. 60/735,850, filed Nov. 14, 2005.

BACKGROUND OF THE INVENTION

1. Field of the Invention

The present invention relates generally to container security and supply chain management and, more particularly, to a distributed processing architecture within a shipping container security system.

2. Background of the Invention

In today's security conscious transportation environment, there is a strong need to cost-effectively and accurately monitor the contents of containerized shipments. This need exists both in the United States and abroad.

Despite the strong need, until recently few solutions, if any, have been able to provide the protection and accuracy needed to suit the transportation industry and the government agencies charged with monitoring shipments. This lack of an acceptable solution is due to many factors which complicate interstate and international shipping. Shipping containers are used to transport most of the commerce entering, leaving, and transiting or moving within the United States. It is estimated that there are over 6 million containers moving in global commerce. Shipping containers have revolutionized the transportation of goods by greatly reducing the number of times goods must be loaded and unloaded during transport. However, at the same time, this same advantage has created a major problem in that it is very difficult to monitor and track the contents of each container during transport.

Beyond their basic construction, monitoring the content of shipping containers is also difficult because these containers are carried through numerous transit points and depots all over the world and it is impractical to stop and check the contents of each container individually at each point of transit. Dealing with this problem, the U.S. Customs Service estimates it can inspect just 5% of the 6 million containers entering and reentering the U.S. each year. Accordingly, agencies such as the United States Customs Service are seeking improved ways to achieve cargo container security and integrity upon arrival at the ports of entry of the United States.

To date, many government agencies have initiated programs to improve container security. These include many useful elements that are intended to preclude their use by terrorists. However, at present, none of the container tracking systems in use provides a way to assure the integrity of the contents of the containers to assure global container security.

However, the reliable detection and processing of the raw sensor data and conversion of this data into actionable reports and recommendations for human operators are complex and daunting tasks. In order to accomplish this function, a container security system may be comprised of various elements, each of them occupying a specific decision support layer and performing a specific task. These elements will interface with adjacent layers and together perform the container security function at a network level in a hierarchical manner.

The benefits of a hierarchical architecture over a centralized processing architecture are significant and include: the ability to process more information and process it quickly; reduction of amount of data sent between various processing elements and the associated reduction in communication link capacity and cost; improvement in the reliability of results and data; reduction of false alarms; and representation of more concise summary to human operators.

DESCRIPTION OF THE RELATED ART

A container security system as described by System Planning Corporation (SPC) (U.S. Pat. No. 7,098,784) herein referred to as "the SPC Invention", performs many of the functions to monitor containers, their content, and to detect tampering within a container during transit. This is accomplished through a device is which located on a container, which performs multiple functions. Some of these functions may include controlling various sensors, collecting the data from these sensors and transmitting this data back to a central monitoring station. The central monitoring station may also send commands and information to individual containers equipment with this device.

To enable information to be transmitted to and from the container, there are several communications subsystems including a satellite or cellular communications device, or both. This system also describes the utilization of a short range wireless or local area communication channel to communicate with various sensors and other elements within the container. The system utilizes the satellite or cellular communications channel to communicate and send status and alarms to a central monitoring station.

While the SPC invention is quite useful, most of the intelligence of the system is concentrated in the central monitoring station, and in the human operators that will be required to interpret the events of various sensors. The processing element located in the container controls the sensor array, and triggers on certain thresholds, but does not offer a higher level of processing sophistication. Currently a very small number of the 6 million containers entering the US are monitored using the SPC and similar monitoring systems. As the number of containers in the monitoring network grows, the SPC and other similar systems may require human intervention and may become bogged down in that operators must sort out events, often in real-time. In addition, because the SPC invention typically simply monitors sensor thresholds, the false alarm rate of the system may be high. Finally, because each trigger event will result in an alarm condition, the amount of traffic sent over the satellite or alternate communications channels will grow, networks may become congested, and the associated monitoring service cost will increase as well.

SUMMARY OF THE INVENTION

To address the problems and limitations noted above, a system and method for distributing the information and decision support processing into discrete, hierarchical processing elements is provided.

The preferred embodiments of the present invention comprise system architecture of a container security system. The architecture may be described as a hierarchical chain of processing elements and a relationship between these elements. Embodiments of the present invention include partitioning of functions, and the distribution of processing among these or other similar hierarchical elements in the network. The elements may further be described in successive layers.

The accompanying drawings, which are incorporated in and constitute a part of this specification, illustrate various embodiments of the invention and, together with the description, serve to explain the principles of the invention.

DESCRIPTION OF THE PREFERRED EMBODIMENTS

The present invention provides a unique system for providing more effective architecture for systems which monitor and report environmental information regarding the status of the shipping container. The preferred embodiments of the present invention are described wherein container security system is divided into specific hierarchical layers. The architecture may have distributed processing and distributed intelligence, such that successive layers process information associated with that particular layer, and pass results to and from adjacent layers. This model is analogous to a complex computation being performed on a parallel processor, which includes multitudes of smaller distributed processing elements which results in a significant increase in the overall computational capacity of the entire system.

Throughout this specification, preferred embodiments of the invention are described in detail below with reference to the accompanying drawings. In the embodiments, various examples and illustrative embodiments are provided. It should be understood that these embodiments and examples are provided purely for purposes of illustration. The present invention is limited solely by the claims appended hereto.

Figure 1:
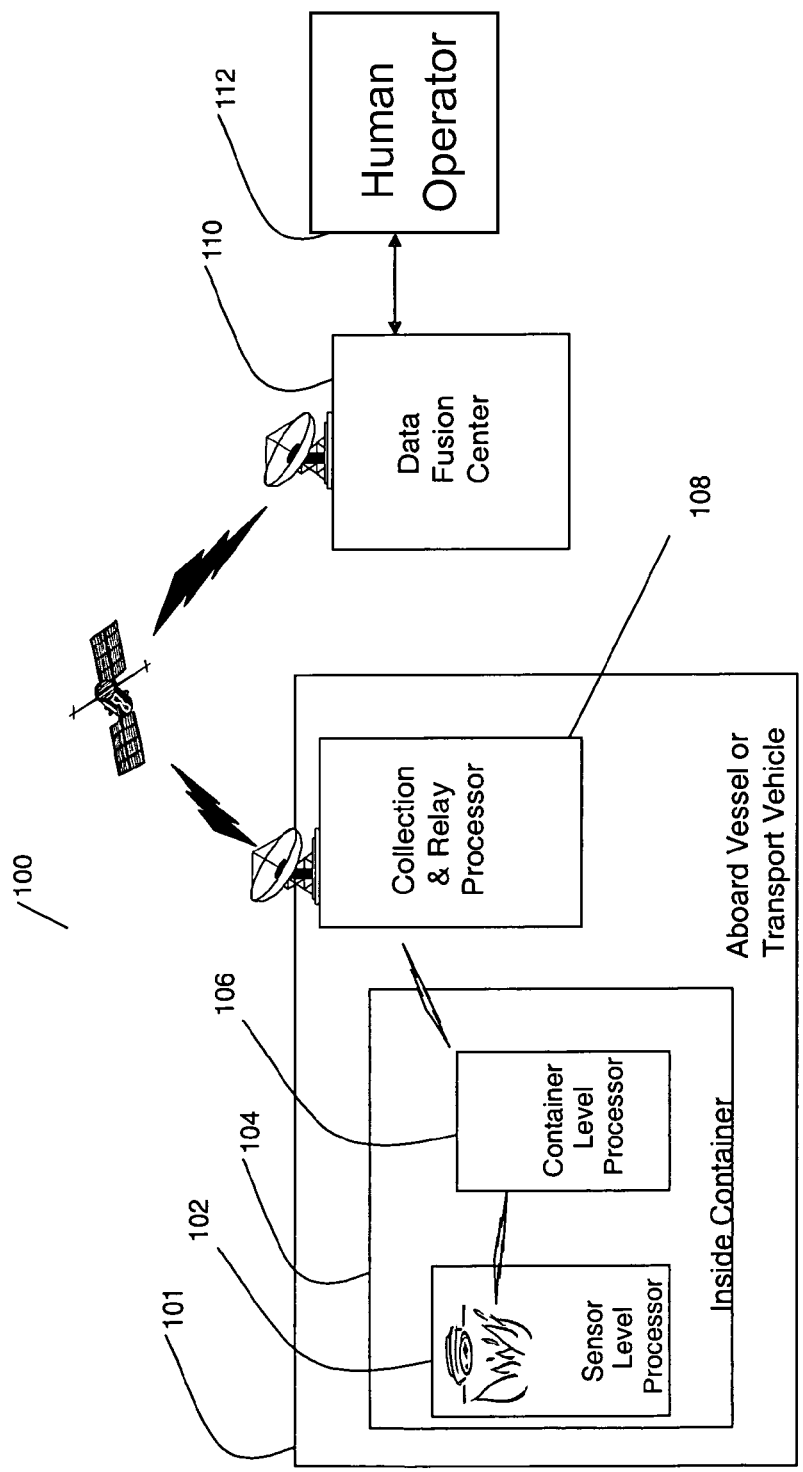
FIG. 1 shows a functional diagram of the various processing elements which comprise the container monitoring system.

With reference now to FIG. 1, and for the purposes of explanation, a hierarchical system architecture 100 comprising multiple layers and distributed processing elements for a monitoring and security system for a plurality of containers 104 which may reside within a vessel or transport vehicle 101 is described. Located within each container 104 in the network may be a sensor level processing element 102 operating on information related to a particular sensor type. In one preferred embodiment of the present invention, the sensor element 102 comprises a sensor, a micro processor element, a communications device which may be wireless or wired, and may have an analog to digital converter. The sensor type may vary depending on the particular application but may include any sensor from a group of sensors containing: temperature sensor, visible light sensor, acoustic sensor, vibration sensor, motion sensor, microbolometer, radiation sensor, hazardous chemical sensor, explosives sensor, proximity sensor, infrared sensor, door switch sensor, image capture sensor, and smoke detector. The sensor element 102 may perform several functions which may include data smoothing, data filtering and reduction, and transmission of sensor data onto the container level processing element, which is the next higher element in the chain.

Again in FIG. 1, the container level processing element 106 may receive raw or processed data from one or multiple said sensor elements 102. The container level element 106 performs several higher level functions which may include comparing sets of sensor data over a fixed or variable time interval, comparing data from one type of sensor to that collected from another type of sensor to determine a higher level event that may have occurred, or sending this data onto the collection and relay processing element. For example, if a sensor door seal triggers, and vibration and acoustic sensors exhibit a specific pattern, then the container processor 106 may conclude with a certain probability that a door opening has occurred. In the preferred embodiment of the present invention, the container processor 106 may query the sensors for additional data or collect additional sensor data readings. This may be performed if previous results indicate an inconsistent conclusion, or if an event would indicate that more data should be taken to further refine a decision or capture data immediately after the event. For example, if a door opening has occurred, the container may collect a series of freeze frames from an image sensor. In this manner intelligence is driven down to the lowest possible system component or layer that has access to the data, reducing raw data being sent over a costly satellite channel, improving response time, and reducing the risk of bogging down central processing elements.

A collection and relay processing element 108 may operate on information related to a group of containers which may be transported together in a shipment. In the preferred embodiment of the present invention, the collection element 108 performs several functions including collecting data from multiple containers either being transported on a vessel or other means, collecting data from multiple containers stored in a shipyard or other staging area such as a manufactures point of origin. In the preferred embodiment of the preset invention, the collection element 108 may also make group comparisons and query individual container processing elements for additional information if required, and send this data onto a data fusion center processing element. For example, given a elevated temperature reading followed by strong acoustic peaks from several containers located in a certain portion of the vessel, the collection and relay processing element 108 may determine that a fire or other hazard may have occurred, and that an explosion may have followed. In this example the information from multiple containers is compared and conclusions may be established based on an aggregate of containers.

In the preferred embodiment of the present invention, a data fusion center processing element 110 may operate on information related to groups or shipments of containers, and information related to each successive lower layer as necessary, and the network as a whole. The data fusion center 110 may perform functions including collecting information from all the collection and relay processing elements in the network, identifying regional level issues based on multiple collection and relay processing elements, identifying overall trends of activity and events for all elements in the network, or prioritizing information based on predetermined importance of certain types of events. The data fusion center 110 is also the last link in the network chain and primary interface to a human operator 112. In the preferred embodiment of the present invention the data fusion center 110 formats and displays information in a graphical manner for the human operator to understand easily and take appropriate action.

The data fusion center 110 may process data at the next level to determine higher level events based on other factors. For example, a container which may have had a door opened in Ohio may not be flagged as a critical event, however one which had an unauthorized opening in Baghdad may be flagged immediately. In the preferred embodiment of the present invention, the data fusion center 110 can process other information based on groups of containers to determine outcomes, and may also look at global trends and apply event probabilities to these trends to filter or weight results or false alarms for future similar occurrences. However, in a preferred embodiment, the data fusion center 110 may be able to query, control, and receive additional data form any element in the network down to the sensor level. This is important because the human operator must be able to have an interface to access every level of the monitoring network. Also, the data fusion center 110 may be required to control certain events at a network level. For example, if certain human intelligence data may indicate that a nuclear device may be inserted into a cargo container in a particular region, the data fusion center may activate an infrequently used, power hungry radiation detector for every container that reports a door opening in that region.

In the preferred embodiment of the present invention, the various processing elements represent functional elements. As such the functions of each discrete processing layer may be combined with the adjacent layer for reasons of implementation simplicity while maintaining functional integrity.

Figure 2:
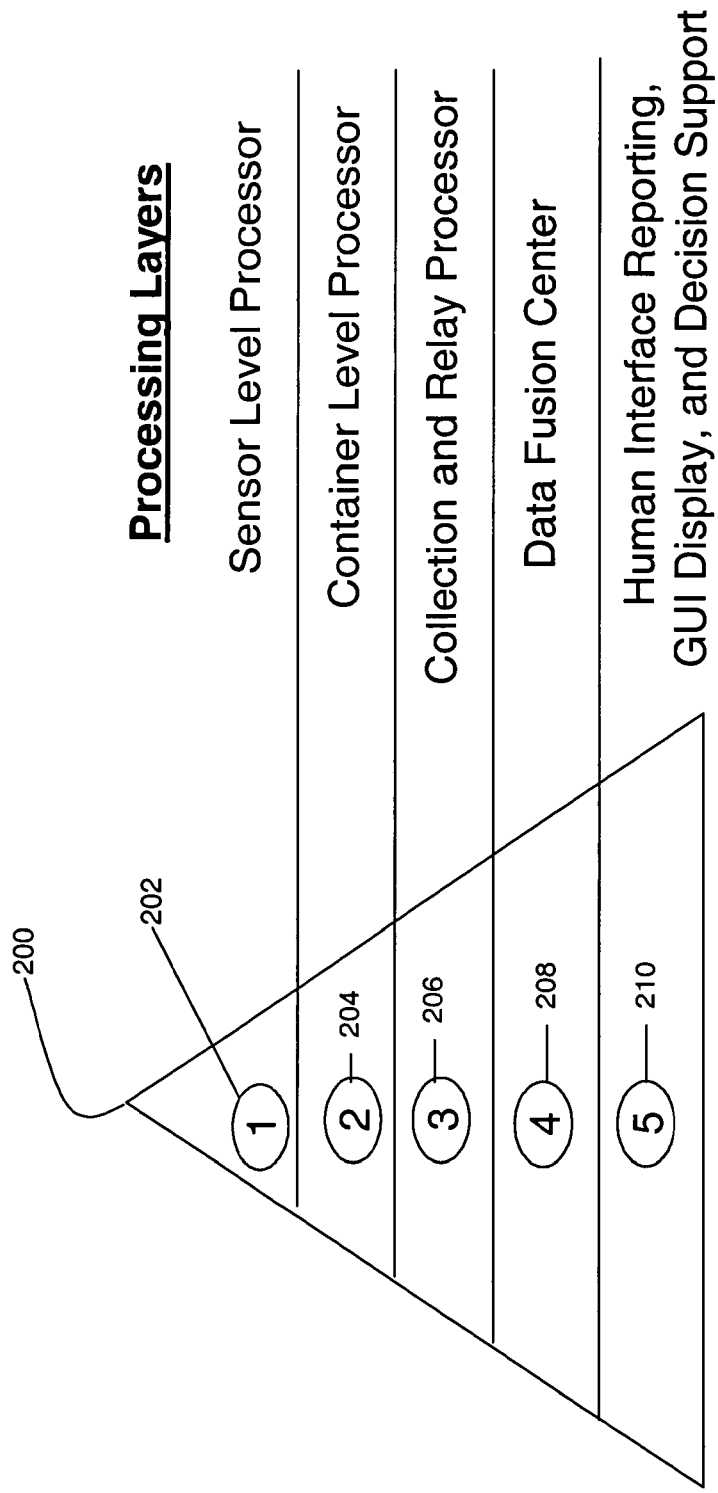
FIG. 2 shows a hierarchical processing system wherein the functions are distributed into multiple layers of intelligence.

As shown in FIG. 2, in the preferred embodiment of the present invention, a container monitoring network architecture 200 can be optimized by empowering each element of the network to process information that is immediately available at that level. In another preferred embodiment, a sensor level processor 202, collects and perform low level data processing before this is sent on to a container level processor 204, which in turn is processed and sent to a collection and relay processor 206, and the information from multiple containers is aggregated and sent to a data fusion center 208, and finally to a human operator 210 who interprets the information and events. In this manner, the total computational bandwidth of the network is the sum of all processing elements within the network. As human operators gain experience in operating the network over several years, the capacity for added intelligence functionality may not easily limited by computation means when using this architecture.

What is claimed is:

1. A hierarchical network system architecture of multiple levels and distributed processing elements for a container monitoring system having a plurality of containers transported by one or more carriers, wherein the system includes at least one monitored container which includes sensors for monitoring at least two aspects of the physical status of the monitored container, wherein the system comprises:
   a data fusion center processing element which is configured to aggregate data from multiple monitored processing elements, wherein the multiple monitored processing elements comprise at least two carrier level processing elements;
   wherein each carrier level processing element is configured to receive and analyze container level data from a group of container level processing elements, and to produce and transmit carrier level data to the data fusion center;
   wherein each container level processing element is configured to receive and analyze sensor level data from a sensor level processing element, and to produce and transmit container level data;
   wherein the sensor level processing element comprising one or more sensors; and
   the sensor level processing element is further configured to produce and transmit the sensor level data to the container level processing element.

2. The system of claim 1, wherein the container level processing element receives raw or processed data from one or multiple sensor level processing elements, the container level processing element performing several functions comprising:
   comparing sets of sensor data over a fixed or variable time interval;
   comparing data from one type of sensor to data collected from another type of sensor to determine a higher level event that may have occurred;
   querying said sensor elements for additional data or collecting additional sensor data readings; and
   sending collected data and comparison results onto the corresponding carrier level processing element above the container level processing element.

3. The system of claim 1, wherein the each carrier level processing element performs several functions comprising:
   collecting data from multiple containers being transported or being stored in a staging area; and
   sending collected data onto a data fusion center processing element.

4. The system of claim 1, wherein the data fusion center processing element performs several functions comprising:
   collecting information from the at least two carrier level processing elements;
   identifying regional level issues based on the at least two carrier level processing elements;
   identifying overall trends of activity and events for container shipments based on processed data;
   prioritizing information based on predetermined importance of certain types of events; and
   formatting information in a graphical manner for a human operator to understand and take appropriate action.

5. The system of claim 1, wherein the each carrier level processing element further comprises an additional container level processing element.

6. The system of claim 1, wherein the each carrier level processing element is configured to monitor multiple containers that are transported together in a shipment, or stored in a storage area.

7. The system of claim 1, wherein the each carrier level processing element is configured to request a second set of container level data from the container level processing unit based on the analysis of a first set of container level data.

8. The system of claim 1, wherein the sensor level processing element comprises a sensor, a microprocessor element, a wired or wireless communications device, and an analog to digital converter.

9. The system of claim 8, wherein the sensor includes at least one sensor from a group of sensors containing: temperature sensor, visible light sensor, acoustic sensor, vibration sensor, motion sensor, microbolometer, radiation sensor, hazardous chemical sensor, explosives sensor, proximity sensor, infrared sensor, door switch sensor, image capture sensor, and smoke detector.

10. The system of claim 8, wherein the sensor level processing element collects raw sensor data and performs functions comprising:
    data smoothing;
    data filtering and reduction;
    sending the smoothed, filtered, and reduced data onto the container level processing element.

11. A container monitoring system having a plurality of containers transported by one or more carriers, wherein the system includes at least one monitored container which includes sensors for monitoring at least two aspects of a physical status of the monitored container, wherein the network system comprises:
    a sensor level processing element comprising one or more sensors, wherein the sensor level processing element is further configured to produce and transmit sensor level data;
    a container level processing element, wherein the container level processing element receives and analyzes data provided by at least two sensors located within a single container; and
    further wherein the container level processing element is configured to produce and transmit at least a first set of container level data and a second set of container level data, wherein the second set of container level data includes data regarding at least one aspect of the physical status of the container not included in the first set of container level data;

a carrier level processing element for collecting and relaying information related to a group of containers, wherein the group of containers are transported or stored together, and the carrier level processing element is configured to aggregate container level data from the group of containers and transmit carrier level data; and a data fusion center which is configured to receive and analyze carrier level data which includes the first set of container level data, wherein the data fusion center is configured to request carrier level data which includes the second set of container level data based on an analysis of the first set of container level data.

12. A method for managing a container monitoring system having a plurality of containers transported by one or more carriers in a hierarchical network structure, the method comprising:

(a) processing sensor level data at a sensor level processing element;

(b) transmitting sensor level data to a container level processing element;

(c) receiving and analyzing data at the container level processing element from at least two sensors located within a single container;

(d) producing and transmitting container level data from a group of containers being transported or stored together to a carrier level processing element;

(e) aggregating container level data from multiple containers at the carrier level processing element, producing and transmitting carrier level data to a data fusion center; and (f) receiving and analyzing carrier level data from at least two carrier level processing elements at the data fusion center.

13. The method of claim 12, wherein step (a) further comprises:

collecting raw sensor data and performing functions comprising:

data smoothing;
data filtering and reduction;
sending the smoothed, filtered, and reduced data onto the container level processing element.

14. The method of claim 12, wherein step (c) further comprises:

comparing sets of sensor data over a fixed or variable time interval;

comparing data from one type of sensor to data collected from another type of sensor to determine a higher level event that may have occurred; and querying said sensor elements for additional data or collecting additional sensor data readings.

15. The method of claim 12, wherein step (e) further comprises:

monitoring an additional container level processing element at the carrier level processing element when an additional container is loaded on a vessel or moved in a storage area.

16. The method of claim 12, wherein step (e) further comprises:

receiving and analyzing a first set of container level data; and requesting a second set of container level data based on the analysis of the first set of container level data.

17. The method of claim 12, wherein step (f) further comprises:

collecting information from the at least two carrier level processing elements;

identifying regional level issues based on the at least two carrier level processing elements;

identifying overall trends of activity and events for container shipments based on processed data;

prioritizing information based on predetermined importance of certain types of events; and formatting information in a graphical manner for a human operator to understand and take appropriate action.

18. The method of claim 12, wherein the data fusion center processing element is configured to aggregate carrier level data from one or more carriers.

* * * * *